US008244972B2

(12) United States Patent
Bronson et al.

(10) Patent No.: US 8,244,972 B2
(45) Date of Patent: Aug. 14, 2012

(54) OPTIMIZING EDRAM REFRESH RATES IN A HIGH PERFORMANCE CACHE ARCHITECTURE

(75) Inventors: Timothy C. Bronson, Round Rock, TX (US); Michael Fee, Cold Spring, NY (US); Arthur J. O'Neill, Jr., Poughkeepsie, NY (US); Scott B. Swaney, Germantown, NY (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 12/822,830

(22) Filed: Jun. 24, 2010

(65) Prior Publication Data

US 2011/0320701 A1   Dec. 29, 2011

(51) Int. Cl.
*G06F 12/00* (2006.01)
(52) U.S. Cl. ......... 711/106; 711/105; 711/118; 711/119
(58) Field of Classification Search ........................ None
See application file for complete search history.

(56) References Cited

U.S. PATENT DOCUMENTS

| 5,446,696 | A | 8/1995 | Ware et al. |
| 6,285,616 | B1 | 9/2001 | Ikabata |
| 6,967,885 | B2 | 11/2005 | Barth, Jr. |
| 2003/0189859 | A1 | 10/2003 | Takahashi et al. |
| 2008/0151670 | A1 | 6/2008 | Kawakubo et al. |
| 2009/0150621 | A1 | 6/2009 | Lee |
| 2009/0248972 | A1 | 10/2009 | Ware |

*Primary Examiner* — Shawn X Gu
(74) *Attorney, Agent, or Firm* — Cantor Colburn LLP; John Campbell

(57) ABSTRACT

Controlling refresh request transmission rates in a cache comprising: a refresh requestor configured to transmit a refresh request to a cache memory at a first refresh rate, the first refresh rate comprising an interval, the interval comprising receiving a plurality of first signals, the first refresh rate corresponding to a maximum refresh rate, and a refresh counter operatively coupled to the refresh requestor and configured to reset in response to receiving a second signal, increment in response to receiving each of a plurality of refresh requests from the refresh requestor, and reset and transmit a current count to the refresh requestor in response to receiving a third signal, wherein the refresh requestor is configured to transmit a refresh request at a second refresh rate, in response to receiving the current count from the refresh counter and determining that the current count is greater than a refresh threshold.

17 Claims, 5 Drawing Sheets

OPTIMIZING EDRAM REFRESH RATES IN A HIGH PERFORMANCE CACHE ARCHITECTURE

BACKGROUND

This invention relates generally to processing within a computing environment, and more particularly to determining the refreshing eDRAM in a high performance cache architecture.

Every new generation of high performance computers seeks increases in performance. There are several methods employed to increase performance, one such method is to increase the size of the computer processor memory caches. Computer processor memory caches are used to improve the access speed of data by storing more frequently used data in fast memory located as close as possible to the computer processor. These computer processor memory caches can include Static Random Access Memory (SRAM) circuits for example. Higher performance computer systems, however, use Embedded Dynamic Random Access Memory (eDRAM) cache circuits. The eDRAM cache is allows for greater capacity in a smaller area by including a higher density of memory circuits within the same area. The eDRAM cache also provides higher performance as compared to SRAM cache. eDRAM cache, however, requires periodic refreshing of the contents of memory. These periodic refreshes may result in degraded performance.

BRIEF SUMMARY

Embodiments include an apparatus for optimizing refresh request transmission rates in a high performance cache comprising a refresh requestor configured to transmit a refresh request to a cache memory at a first refresh rate, the first refresh rate comprising an interval, the interval comprising receiving a plurality of first signals, the first refresh rate corresponding to a maximum refresh rate. The apparatus further comprises a refresh counter operatively coupled to the refresh requestor and configured to reset in response to receiving a second signal, increment in response to receiving each of a plurality of refresh requests from the refresh requestor, and reset and transmit a current count to the refresh requestor in response to receiving a third signal wherein the refresh requestor is configured to transmit a refresh request at a second refresh rate, the second refresh rate less than the first refresh rate, in response to receiving the current count from the refresh counter and determining that the current count is greater than a refresh threshold.

Further embodiments of the invention include an apparatus for optimizing refresh request transmission rates in a high performance cache comprising a refresh requestor and a refresh counter on a single chip, the refresh requestor configured to transmit a refresh request to a cache memory at a first refresh rate, the first refresh rate comprising an interval, the interval comprising receiving a plurality of first signals, the first refresh rate corresponding to a maximum refresh rate. The apparatus further comprises the refresh counter operatively coupled to the refresh requestor and a time of day circuit (TOD), the TOD external to the single chip, the refresh counter configured to reset in response to receiving a second signal from the TOD, increment in response to receiving each of a plurality of refresh requests from the refresh requestor, and reset and transmit a current count to the refresh requestor in response to receiving a third signal from the TOD, wherein the refresh requestor is configured to transmit a refresh request at a second refresh rate, the second refresh rate less than the first refresh rate, in response to receiving the current count from the refresh counter and determining that the current count is greater than a refresh threshold.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

High performance computer systems depend on processing data at high speeds. Typical computer systems store data hierarchal in various forms and locations of memory. Most data is stored in main memory. Main memory is large, however, because main memory is accessed over a memory bus, access to data can be slow and resource contentions caused by bottlenecks are common. Modern computer systems store frequently accessed data in cache memory. The cache memory is located on or near the computer processor chip. The cache is arranged in levels. Level one cache (L1) is closest to the processing core, and level two (L2), level three (L3), level four (L4) and other cache levels progressively more distant. Caches are often much smaller than main memory therefore space is limited and the most accessed data is placed closest to the core. The larger the cache, the more data can be stored, and therefore quickly accessed by the processing core. Typical cache memory, such as SRAM, use large cache memory structures, which take up more space, and are slower to access than smaller caches. eDRAM, however, can fit more memory capacity in the same physical area than SRAM. Therefore, the use of eDRAM can greatly increase the capacity and speed of data access. eDRAM is based on capacitors as opposed to transistor based memory such as SRAM, and therefore, over time, the data that is stored in eDRAM as electrical signals starts to degrade. eDRAM must be refreshed periodically by recharging the capacitors. This is typically done in main memory using dedicated circuitry. When eDRAM is implemented in cache, however, these additional dedicated circuits may interfere with the performance of the cache. Therefore, where eDRAM is used in cache, it would be preferable to send requests to refresh data over the same cache pipelines as data access requests. One way of using the refresh requests over a cache pipeline is described in commonly assigned U.S. patent application Ser. No. 12/822,245, entitled "EDRAM REFRESH IN A HIGH PERFORMANCE CACHE ARCHITECTURE" filed on Jun.

24, 2010, which is incorporated by reference herein in its entirety. The refresh requests must be timed such that all of the cache memory is refreshed before the signal can degrade. One option of refresh timing is to simply refresh memory over a fixed number of processing cycles in order to ensure all data is refreshed. A more optimized refresh frequency, however, would result in better performance by ensuring that the refreshing of the cache is completed in as long a window as possible while still ensuring that all of the memory is appropriately refreshed. A longer window for refresh requests will reserve more of the cache pipeline for memory access requests. Therefore, an optimal refresh request frequency will ensure that the cache memory does not degrade while increasing the performance of the cache.

Figure 1:
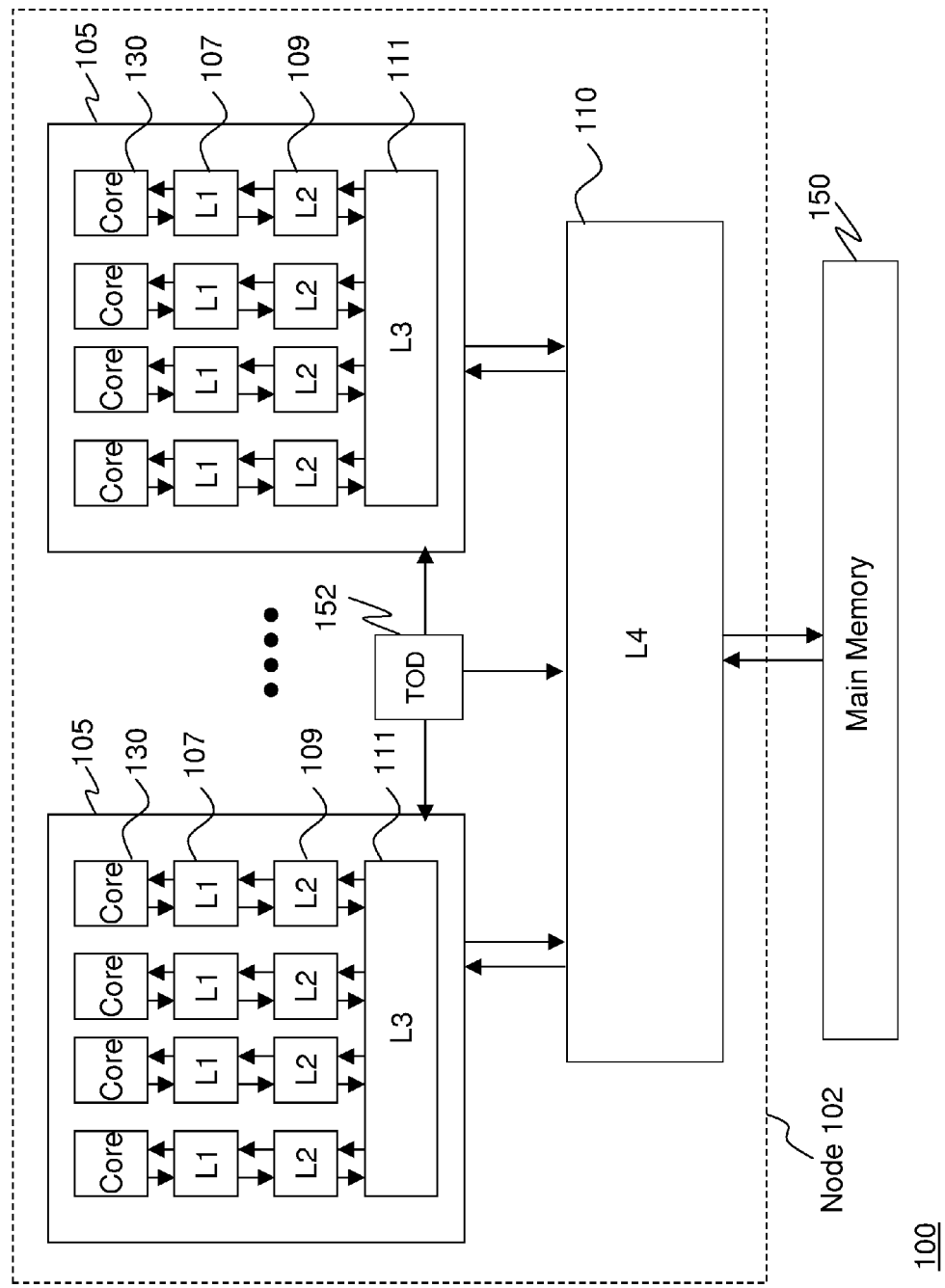
FIG. 1 depicts an example of a system on which embodiments of the present invention may be implemented.

FIG. 1 illustrates an example of a computing system 100 according to one embodiment. The system includes one or more nodes 102. In one embodiment, the computing system 100 may include four nodes 102. In the computing system 100, multiple nodes 102 may be operatively connected to one another for communicating such as making and responding to requests, as understood by one skilled in the art.

Each node 102 includes one or more central processors 105. In one embodiment, each node 102 includes six central processors 105. The central processors 105 include one or more cores 130 that perform the reading and executing of instructions. In one embodiment, one or more of the central processors 105 include four cores 130. Of course, the central processors 105 could include any number of cores 130 that is greater than or equal to two.

Each core 130 is operatively coupled to its own L1 and L2 cache, 107 and 109 respectively. The L1 caches 107 are physically closest to the cores 130 and the L2 caches 109 are coupled to the L1 caches 107. Each L2 cache 109 in each central processor 105 is coupled to a single L3 cache 111. In this manner, the L3 cache 111 is shared by multiple L2 caches 107 and accessible by each of the cores 130.

The node 102 also includes one or more L4 caches 110. The L4 caches 110 are operatively coupled to two or central processors 105. In this manner, the L4 caches 110 are shared by multiple L3 caches 111 and accessible by any of the cores 130 on any of the central processors 105. The computing system 100 may also include main memory 150 operatively coupled to the L4 caches 110.

In one embodiment, the L3 caches 111 and L4 cache 110 are formed of embedded dynamic random access memory (DRAM) which is referred to as eDRAM. Of course, it is understood by a skilled artisan that any other types of suitable memory such as DRAM may be utilized. In one embodiment, the L2 caches 109 may be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 are between 96 and 128 KB, the L2 caches 109 are 1.5 MB, the L3 cache is 24 MB and the L4 cache 110 is 192 MB. Of course other sizes could be utilized. In FIG. 1, the four different levels of caches (L1, L2, L3 and L4) are shown. Of course, such an organization of caches is exemplary only and the teachings herein may be applied to any situation where multiple central processors 105 have access to a shared cache and the shared cache is one of a plurality of shared caches that have access to another shared cache. In an exemplary embodiment, the node 102 also includes a time of day logic (TOD) 152. The TOD 152 maintains a precise time of day. In an exemplary embodiment, the time of day is tracked as seconds elapsed since Jan. 1, 1900 0 A.M. Greenwich Mean Time (GMT). Of course other mechanism for tracking time could be used as is known in the art (ex. Coordinate Universal Time (TOD)). The TOD 152 is operatively coupled to the caches (L1 107, L2 109, L3 111, L4 110, . . . ) and issues two signals. The first signal is a signal that indicates that the TOD 152 is functioning normally. The second signal is repeated at the same time interval (i.e. 100 microseconds) and can be used to count a precise elapsed time period. The TOD 152 is used to supply a precise time to applications run on a system with distributed processor cores and even distributed interconnected machines. The TOD 152 has been described as tracking time in a particular fashion for purposes of explanation. It will be understood, however, that other implementations and mechanisms, both hardware and software, or a combination of hardware and software as is known in the art could be used to achieve the same result.

Figure 2:
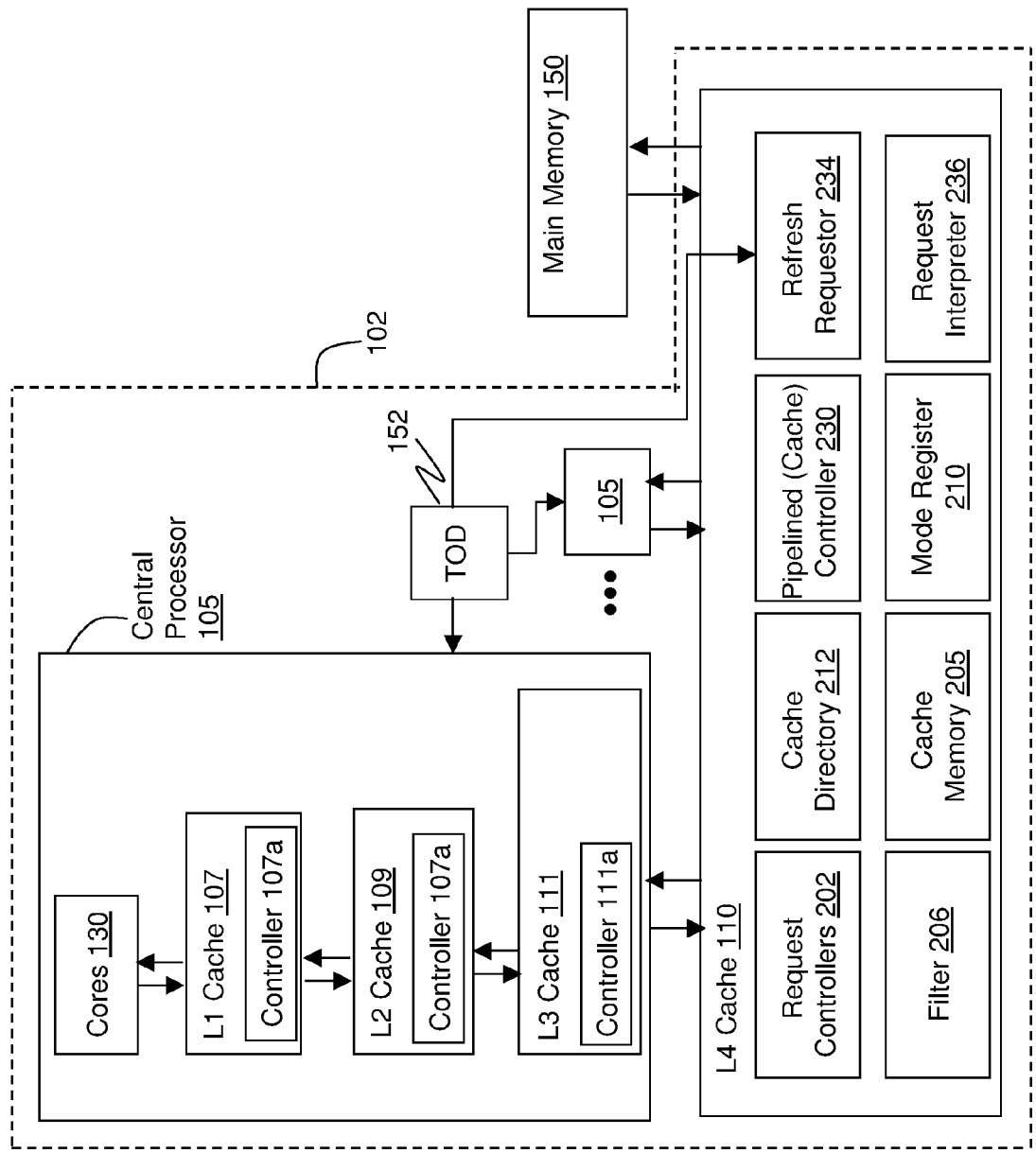
FIG. 2 depicts an embodiment of a system node on which embodiments of the present invention may be implemented.

FIG. 2 illustrates further details of the central processor 105 and the L4 cache 110 according to exemplary embodiments. For ease of explanation, FIG. 2 shows the details of a single central processor 105 operatively connected to a single L4 cache 110 but applies for multiple central processors 105 and multiple L4 caches 110. In FIG. 2, each of the L1 caches 107, L2 caches 109, L3 caches 111, and L4 caches 110 includes its own respective pipelined cache controller 107a, 109a, 111a, and 230 (also referred to herein as cache controller) for controlling various operations such as sending, receiving, and executing requests (also referred to as request signals).

In accordance with exemplary embodiments, one or more requestors (also referred to herein as memory access request sources) indicate all of the desired resources and/or actions that they wish to be performed by the L4 cache 110, even if the requestor does not necessarily require that all actions be performed in one pass through the pipelined cache controller 230 of L4 cache 110. In one embodiment the requestors are L3 caches 111, the L2 caches 109, the L1 caches 107, the cores 130, and other nodes 102. In an exemplary embodiment the requestors are on a plurality of central processor 105. In additional embodiments the requestors are on a single central processor 105. The requestors may be on the same and/or different nodes 102. In further embodiments the requestor is an I/O controller (not shown), as understood by one skilled in the art. Each requestor is able to individually transmit requests to one or more request controllers 202 indicating the desired actions and/or resources that the requestors wish for the L4 cache 110 to perform.

The requests may be for accessing a cache directory 212 of L4, or cache memory 205 of the L4 cache 110 (also referred to herein as memory access requests), or to accessing main memory 150, and/or accessing other nodes 102. The L4 cache 110 of FIG. 2 includes a plurality of components for controlling various operations as described above. The requestors request access to a plurality of these components such as the cache directory 212, cache memory 205 of the L4 cache 110. In addition, the requestors request access to main memory 150, and other nodes 102. Also note that although exemplary implementations depict examples with respect to the L4 cache 110, it is understood that exemplary embodiments are not meant to be limited to operations of the L4 cache 110. For example, the technique disused herein applies equally to the L3 cache 111 receiving requests from, e.g., the L2 cache 109 and the L4 cache 110. Furthermore, the L1 cache 107, L2 cache 109 and the L3 cache 111 may include the elements shown and described for the L4 cache 110. Also, additional embodiments may be implemented in, e.g., main memory 150, external memory (not shown), and any other hardware component, and the main memory 150, external memory, and hardware component would include the elements shown and described herein for the L4 cache 110.

A plurality of requestors (such as cores 130, L3 caches 111, L2 caches 109, L1 caches 107, and/or other nodes 102) make requests to the request controllers 202 of the L4 cache 110. Each request controller 202 receives these requests as an 8-bit vector, via a request signal from the requestors. Each bit of the 8-bit vector corresponds to an action and/or a series of actions for the L4 cache 110 to perform, and the 8-bit vector may be referred as the mode, request mode, pipeline mode, and/or mode (0:x). The 8-bit vectors are stored in (read into) respective mode registers 210 of the L4 cache. Note that although an 8-bit vector may be discussed for explanation purposes, other size vectors (e.g., smaller and larger) may also be utilized and exemplary embodiments are not meant to be limited to any one sized vector.

According to exemplary embodiments, the requestors such as the cores 130 and L3, L2, and L1 caches (via their respective pipelined cache controllers 111a, 109a, and 107a) are each configured to transmit additional signals along with their request signal to the request controllers 202. As a result, in addition to the request controllers 202 receiving the 8-bit vector which is the mode as described above, the request controllers 202 are configured to receive and process the additional signal via filters 206. The additional signal may be an additional 8-bit vector that allows the filter 206 to determine if the filter 206 can dynamically modify (i.e., whether it has permission to modify) the mode received from the requestor. The additional 8-bit vector is configured to correspond one-to-one to bits of the 8-bit vector of the mode, and when a (flexible) bit of the additional 8-bit vector is turned on, the filter 206 is configured to read this flexible bit as a designation that the corresponding bit of the 8-bit vector of the mode is flexible. The filter 206 includes input selection logic, e.g., such as logic gates, configured to perform logic operations to determine if modification is permitted and/or needed as discussed herein.

Using the additional set of signals in accordance with exemplary embodiments, the requestor is able to indicate (to the filter 206 of the L4 cache 110) which actions and/or resources the requestor can allow to be deferred to a subsequent (and/or multiple subsequent) pipe controller request. The input selection logic of the filter 206 is then able to check the availability of the requested actions and/or resources. If one or more requested actions and/or resources is not available and if the requestor has indicated in the additional signal that all of these unavailable actions and/or resources can be deferred to a subsequent pipeline request, the selection logic of the filter 206 is configured to allow that request from the requestor to enter the pipelined cache controller 230 by altering the mode. To signal that some requested actions and/or resources were unavailable in the mode, the selection logic of the filter 206 dynamically alters the requestor's pipeline mode to indicate which actions were actually performed and which (originally requested) actions are not performed. The request controller 202 compares the altered mode that entered into the pipelined controller with the original mode it requested to determine which actions the request controller 202 must still complete. In other words, any actions that were unable to be performed and removed in the altered mode (by the filter 206), can be determined and attempted again by the request controller 202. The request controller 202 and/or the requestor can send a new request in a mode requesting the particular actions that were not performed earlier.

With this method, requestors indicating a need for multiple actions and/or resources do not need to serialize their requests. Instead, the requestors can request everything that they want to do, and if all the action/resources are available, the actions and/or resources will be performed in one pass through the pipelined cache controller 230. If some actions needing particular resources are unavailable, those actions for resources that are available are allowed to proceed by the filter 206, while the actions for unavailable resources are removed from mode by the filter 206 and thus not performed. On average, requestors will be able to complete their pipelined controller activity with fewer pipeline requests compared to forcing the requestors to serialize their requests.

Figure 3:
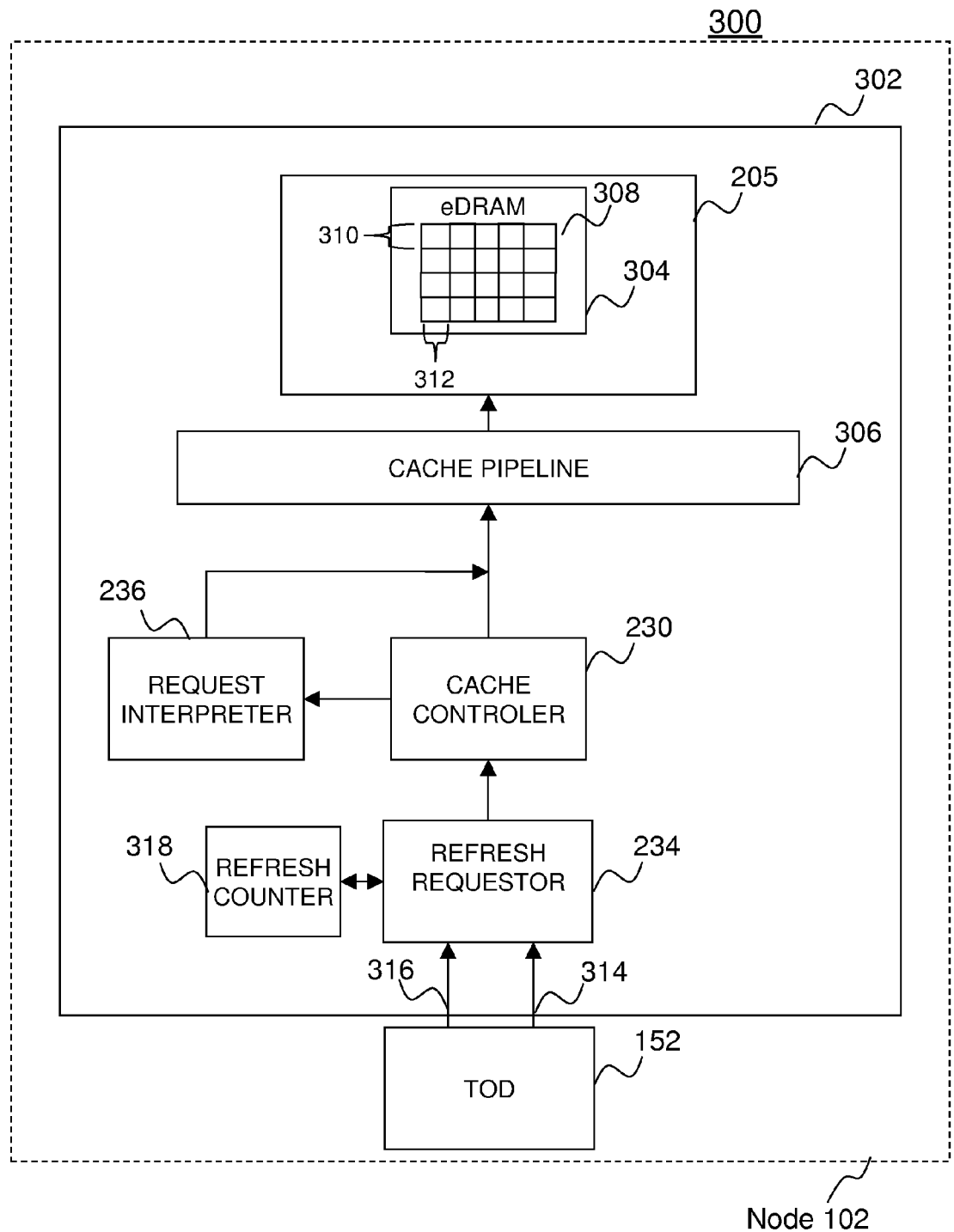
FIG. 3 depicts an example of a cache controller according to one embodiment on which the present invention may be implemented.

The pipelined cache controller 230 accesses a cache directory 212 to obtain the location of what memory addresses are available in the cache memory 205. The L4 cache also includes a refresh requestor 234 (also referred to herein as a memory refresh requestor) and a request interpreter 236 (also referred to herein as a memory request interpreter) for interpreting the refresh requests sent by the refresh requestor 234 for refreshing the cache memory 205 as will be described in more detail below. In an exemplary embodiment the request interpreter 236 is logic built into a bank mode of the cache (not shown), which interprets all data access requests sent by requestors as is known in the art. In addition, the TOD 152 provides two signals to each central processor 105 in the node 102. These two signals are the active signal 316, which indicates that the TOD 152 is functioning, and the interval pulse 314 which pulses at a constant time interval. Although FIG. 3 depicts the active signal 316 and interval pulse 314 as separate connections, it will be understood that in additional embodiments the TOD 152 transmits both pulses over a single connection. These signals are also routed to a plurality of components in the central processor 105 including the L3 cache 111. In alternate embodiments, the two signals produced by the TOD 152 are also routed to the L2 cache 109, and the L1 cache 107. Both signals are also sent to the refresh requestor 234 of the L4 cache 110.

The L4 cache 110 is detailed for ease of explanation, but it will be understood that in an exemplary embodiment the L3 cache 111 may include the same components described above with regard to the L4 cache 110. In additional embodiments, the L1 cache 107 and L2 caches 109 additionally may include the components described above with regard to the L4 cache 110. Although exemplary embodiments of L4 cache and L3 cache include all of the components above on a single processing circuit (cache chip), in additional embodiments, some or all of the components may exist outside of the cache chip.

Turning now to FIG. 3, an exemplary embodiment of a memory refresh system 300 including the memory refresh components 234 and 236 depicted in FIG. 2 for refreshing cache memory 205 will be described. In an exemplary embodiment, the cache memory 205 includes eDRAM 304. The eDRAM 304 includes addressable memory circuits 308 for storing data. The data is stored and accessed in the eDRAM 304 by an address in the addressable memory circuit 308. The addressable memory circuits 308 are configured in rows 310 and columns 312 collectively called cache blocks. In an exemplary embodiment, the cache blocks are built onto a single chip such as eDRAM 304, however, in alternate embodiments, the cache blocks are built across multiple chips as is known in the art. The eDRAM's 304 addressable memory circuits 308 store data as an electrical signal wherein voltage above a preset voltage (e.g. 0.85 volts) signifies a binary 1 with lower voltages signifying binary zero as is known in the art. In one embodiment 0.85 volts is the cutoff for binary 1 for, of course other voltages (e.g., lower and higher) may also be utilized and exemplary embodiments are not meant to be limited to any one voltage.

The addressable memory circuits 308 include capacitors (not shown) that are charged to indicate binary 1 and discharged to indicate binary 0. After a period of time (e.g. 40 microseconds) the charge applied to the capacitor degrades to a point where the binary 1 will be read as a binary 0. The period of time after which data may be lost is specified in real time and not processing cycles (i.e. CPU cycles). In order to prevent the loss of data that would occur in this situation, each of the addressable memory circuits 308 are refreshed periodically, recharging the capacitors that are set to binary 1. The eDRAM 304 is preferably refreshed before the eDRAM 304 loses data. Refreshes are sent as refresh requests (also referred to herein as memory refresh requests) by the refresh requestor 234. In an exemplary embodiment the refresh requestor 234 receives a signal from the node 102 for each computing cycle (e.g. CPU cycle). In an alternate embodiment, the computing cycle signal is received from a clock (not shown) within the computing system 100 and outside of the node 102. The refresh requestor 234 sends refresh requests to the cache controller 230 using the same 8-bit vector described above and a target memory address of the cache row 310 that is to be refreshed. The refresh requests are in the same format as memory access requests sent by other requestors and are, therefore, interpreted by the cache controller 230 as standard memory access requests. The cache controller 230 routes the refresh request to the request interpreter 236 (also referred to herein as memory request interpreter). The refresh requestor 234 is operatively coupled to a refresh counter 318. The refresh counter 318 counts the number of refresh requests sent by the refresh requestor 234 as will be described in more detail below. The request interpreter 236 the data access request and identifies the request as a refresh request as will be described in more detail below. The refresh request is then sent to the pipeline controller 222, which places the refresh request in the cache pipeline 306 when the address targeted in the refresh request is free as will be described in more detail below. The cache pipeline 306 routes the refresh request to the cache memory 205, which causes the target addressable memory circuit 308 to be refreshed. In order to optimize the refresh intervals discussed above, the TOD 152 is used. As described above, the TOD 152 provides an active signal 316 to indicate that the TOD 152 is functioning correctly. In addition, the TOD 152 provides an interval pulse 314 at regular time intervals (e.g. 100 microseconds). These two pulses are sent to the refresh requestor 234 and are used to calculate the optimal interval between refresh requests as will be described in more detail below.

Figure 4:
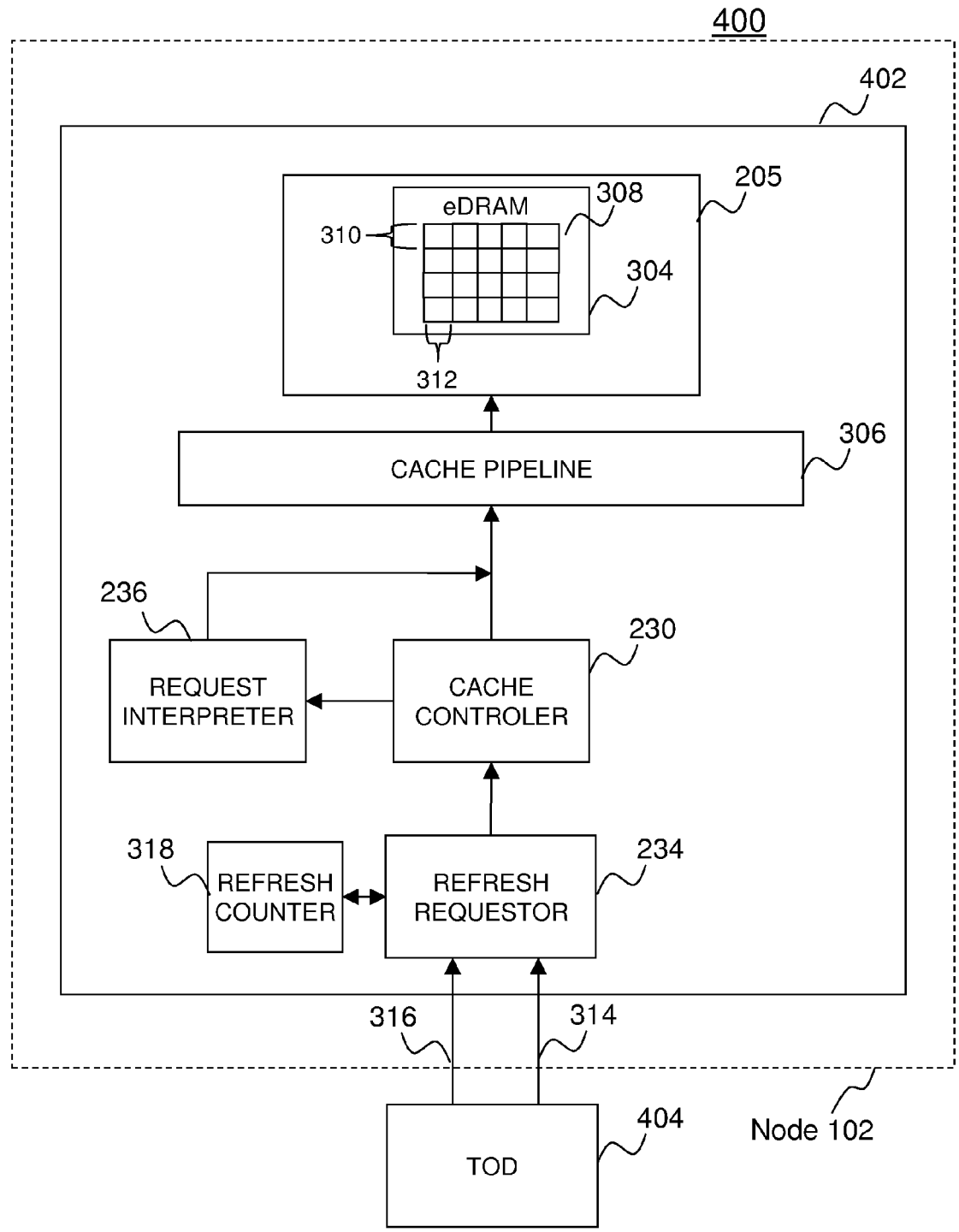
FIG. 4 depicts an alternate embodiment a cache controller according to on which the present invention may be implemented.

Turning now to FIG. 4, an additional embodiment of an externally supported memory refresh system 400 including memory refresh components depicted in FIG. 2 for refreshing cache memory 205 will be described. In an exemplary embodiment, the cache memory 205 include eDRAM 304 as described above with regard to FIG. 3. The addressable memory circuits 308 require periodic refreshes as described above. The refresh requestor 234 receives two signals as described above from an external TOD 404. The external TOD 404 may be located on another node (not shown) on the same computing system 100 as the node 102, or may be located on a different computer communicatively coupled to computing system 100 through a direct connection, as is known in the art, or over a network (not shown).

Figure 5:
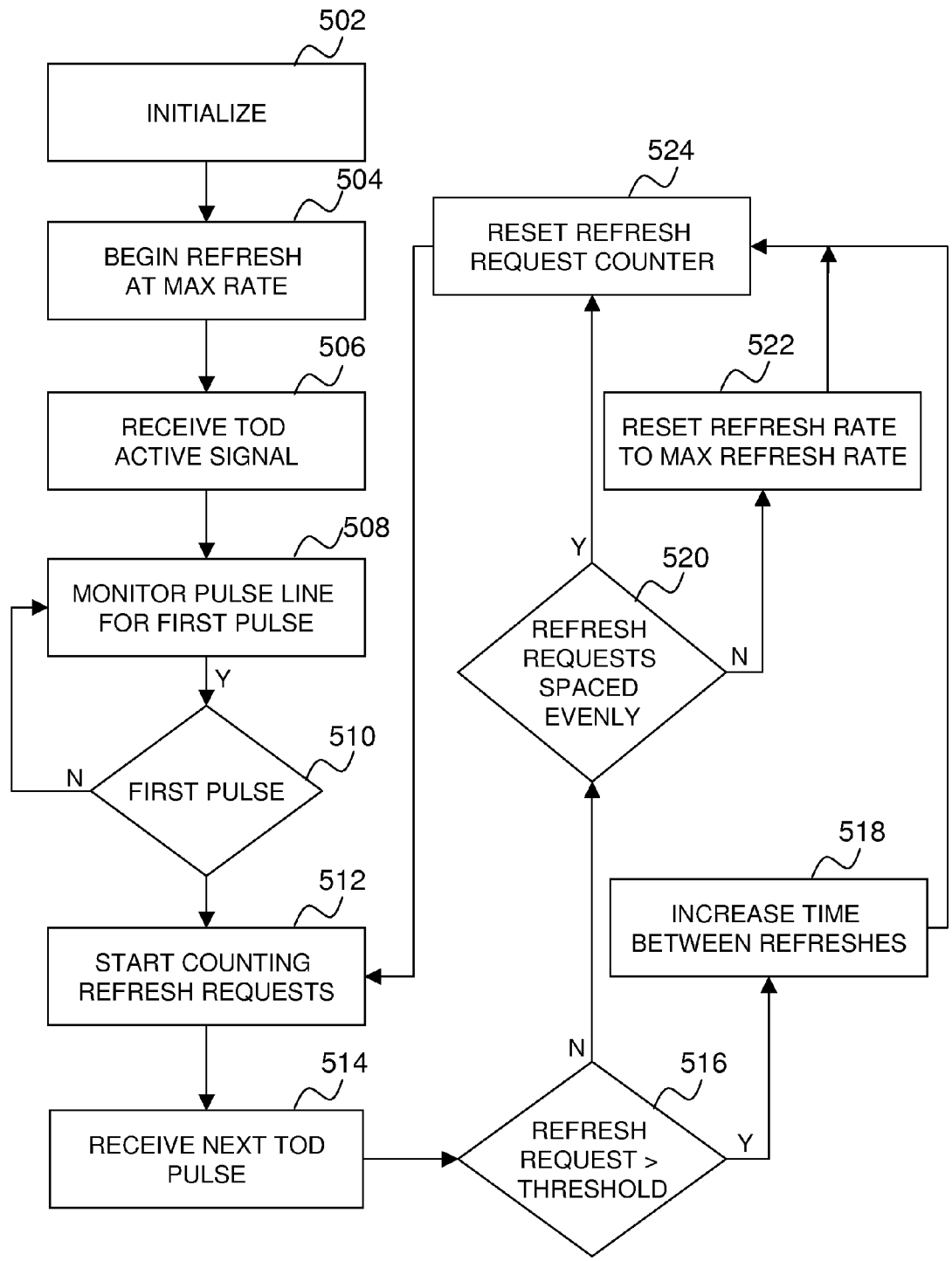
FIG. 5 depicts a block diagram of a process flow for refreshing the cache according to an exemplary embodiment of the invention.

Turning now to FIG. 5, a detailed block diagram of an exemplary embodiment of an optimal refresh request frequency determination processing flow will now be described. In an exemplary embodiment, the refresh request frequency determination processing flow executes in the refresh requestor 234 of FIGS. 3 and 4. At block 502 the refresh requestor 234 is initialized. The refresh requestor 234 may be initialized when the node 102 is initialized, or by a reset command. At block 504 the refresh requestor 234 begins refreshing at a maximum refresh rate. The refresh requestor 234 is programmed to space refresh requests at an interval that would ensure a full refresh at the lowest processing speed supported by the processor. The maximum required refresh interval is determined by taking the required refresh rate of a cell and dividing that by the number of refresh requests required to refresh the entire cache memory 205. The result is the required time between refresh commands. This is divided by the cycle time of the lowest supported processing speed supported by the central processor 105. The final result is the maximum number of cycles between refresh requests to refresh the cache memory 205 at continuous intervals. These intervals are measured in computing cycles. Because the computing cycle frequency may change based on the computing system's 100 clock frequency, these intervals can vary greatly in terms of actual real world time. For example if the required refresh rate of the cache memory 205 is 100 microseconds and 250 refresh requests are required to refresh the entire cache memory 205, the required time between refresh commands is 400 nanoseconds. If the cycle time of the refresh requestor 234 is 500 picoseconds the number of required clock intervals between refreshes would be 800 cycles. If, for example, the cycle time of the refresh requestor 234 is 400 picoseconds the number of required clock intervals between refreshes would be 1000 cycles. At block 506, the refresh requestor 234 receives an active signal 316 from the TOD 152 indicating that the TOD 152 is initialized and functioning properly. At block 508 the refresh requestor 234 and the refresh counter 318 monitor for the interval pulse 314 which will be sent from the TOD 152. At block 510, if the first interval pulse 314 has not been received, the refresh requestor 234 continues monitoring for the first interval pulse 314. Otherwise, if the refresh requestor 234 receives a first pulse from the TOD 152. At block 512, the refresh counter 318 begins counting the number of refresh requests sent by the refresh requestor 234. The refresh counter 318 increments by one each time it receives a refresh request signal from the refresh requestor 234. At block 514, a second interval pulse 314 is received by the refresh requestor 234 and the refresh counter 318. When the refresh counter 318 receives the second interval pulse 314 from the TOD 152 it sends the current count to the refresh requestor 234.

At block 516, the refresh requestor 234 determines if the current count received by the refresh requestor 234 from the refresh counter 318 is greater than a threshold value (also referred to herein as refresh threshold or optimal refresh rate). The threshold value determines the optimal number of refreshes that should occur between each interval pulse 314 of the TOD 152. The threshold value is determined by taking the amount of time required to refresh the cache memory 205 and dividing that by the real time clock pulse time supplied by the TOD 152. This is the number of interval pulses 314 that represent a refresh period. The number of refresh requests required to refresh the entire cache memory 205 is divided by the number of interval pulses 314 in the refresh period to calculate the number of refresh requests that need to be performed per interval pulse. At block 518, if the number of refreshes is greater than the threshold value, the number of computing cycles between each refresh request is increased. This increase in computing cycles effectively decreases the refresh request rate. At block 524, the refresh counter 318 is reset and the refresh counter 318 begins counting again at block 512.

Returning now to block 516, if the refresh request is not greater than the threshold value, the refresh requests are checked to determine if they are spaced evenly at block 520. If the number of computing cycles between the last refresh request and the interval pulse 314 is less than the number of computing cycles between any of the other refresh requests (i.e. at a varying interval), the refresh request rate is set to the maximum refresh request rate at block 522. Then at block 524, the refresh counter 318 is reset and the refresh counter 318 begins counting again at block 512. Otherwise, if the refresh requests are evenly spaced optimal refresh rate has been achieved and at block 524 the refresh counter 318 is reset and the refresh counter 318 begins counting again at block 512. The processing flow between blocks 512 and 524 are repeated until the computing system 100 is shutdown.

For clarity, the above process flow was described with regard to TOD 152 of FIG. 3. It will be understood, however, that in additional embodiments the computing system 100 is configured to use one or more external TODs 404 instead of or in addition to TOD 152. Although aspects of the present invention have been described as operating on various hardware and circuit components, it will be understood that the invention may be realized by software or a combination of software and hardware components as will be understood.

Technical effects and benefits include calculating an optimal refresh rate based on converting computing cycles to real world time in order to reduce the overhead required for refreshing eDRAM or other types of memory which may require refreshes. When the refresh rate is optimized more computing cycles are available for data access therefore resulting in increased performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. An apparatus for optimizing refresh request transmission rates in a high performance cache comprising:
   a refresh requestor configured to transmit a refresh request to a cache memory at a first refresh rate, the first refresh rate comprising an interval, the interval comprising receiving a plurality of first signals, the first refresh rate corresponding to a maximum refresh rate; and
   a refresh counter coupled to the refresh requestor and configured to reset in response to receiving a second signal, increment in response to receiving each of a plurality of refresh requests from the refresh requestor, and reset and transmit a current count to the refresh requestor in response to receiving a third signal;
   wherein the refresh requestor is configured to transmit a refresh request at a second refresh rate, the second refresh rate less than the first refresh rate, in response to receiving the current count from the refresh counter and determining that the current count is greater than a refresh threshold.

2. The apparatus of claim 1 wherein the cache memory is operatively coupled to the refresh requestor and the refresh counter.

3. The apparatus of claim 1, wherein the cache memory comprises enhanced dynamic random access memory (eDRAM).

4. The apparatus of claim 1, wherein the plurality of first signals are central processing unit (CPU) cycles received from a node.

5. The apparatus of claim 1, wherein the second signal is a time of day (TOD) interval pulse.

6. The apparatus of claim 1, wherein the second signal is a time of day (TOD) active signal.

7. The apparatus of claim 1, wherein the third signal is a time of day (TOD) interval pulse, the third signal a next signal received after the second signal.

8. The apparatus of claim 1, wherein the refresh requestor is further configured to transmit refresh requests at the first refresh rate in response to receiving the current count from the refresh counter and determining that a number refresh requests transmitted between the second signal and the third signal were sent at a varying interval.

9. The apparatus of claim 1, wherein the cache memory is one of:
   a level one cache;
   a level two cache;
   a level three cache; and
   a level four cache.

10. An apparatus for optimizing refresh request transmission rates in a high performance cache comprising:
    a refresh requestor and a refresh counter on a single chip;
    the refresh requestor configured to transmit a refresh request to a cache memory at a first refresh rate, the first refresh rate comprising an interval, the interval comprising receiving a plurality of first signals, the first refresh rate corresponding to a maximum refresh rate; and
    the refresh counter operatively coupled to the refresh requestor and a time of day circuit (TOD), the TOD external to the single chip, the refresh counter configured to reset in response to receiving a second signal from the TOD, increment in response to receiving each of a plurality of refresh requests from the refresh requestor, and reset and transmit a current count to the refresh requestor in response to receiving a third signal from the TOD;
    wherein the refresh requestor is configured to transmit a refresh request at a second refresh rate, the second refresh rate less than the first refresh rate, in response to receiving the current count from the refresh counter and determining that the current count is greater than a refresh threshold.

11. The apparatus of claim 10, wherein the cache memory is operatively coupled to the refresh requestor and the refresh counter.

12. The apparatus of claim 10, wherein the cache memory comprises enhanced dynamic random access memory (eDRAM).

13. The apparatus of claim 10, wherein the plurality of first signals are central processing unit (CPU) cycles received from a node.

14. The apparatus of claim 10, wherein the second signal is an interval pulse.

15. The apparatus of claim 10, wherein the second signal is an active signal.

16. The apparatus of claim 10, wherein the third signal is a time of day (TOD) interval pulse, the third signal a next signal received after the second signal.

17. The apparatus of claim 10, wherein the refresh requestor is further configured to transmit refresh requests at the first refresh rate in response to receiving the current count from the refresh counter and determining that a number refresh requests transmitted between the second signal and the third signal were sent at a varying interval.

* * * * *